(12) United States Patent
Kumon

(10) Patent No.: US 7,331,416 B2
(45) Date of Patent: Feb. 19, 2008

(54) OIL-HYDRAULIC VEHICLE

(75) Inventor: Shigetomi Kumon, Ehime (JP)

(73) Assignee: Asahi Corporation, Ehime (JP)

( * ) Notice: Subject to any disclaimer, the term of this patent is extended or adjusted under 35 U.S.C. 154(b) by 0 days.

(21) Appl. No.: 10/569,547

(22) PCT Filed: Apr. 16, 2004

(86) PCT No.: PCT/JP2004/005520

§ 371 (c)(1),
(2), (4) Date: Sep. 13, 2006

(87) PCT Pub. No.: WO2005/100070

PCT Pub. Date: Oct. 27, 2005

(65) Prior Publication Data

US 2007/0045031 A1    Mar. 1, 2007

(51) Int. Cl.
*B62D 6/08* (2006.01)
(52) U.S. Cl. ............... 180/305; 180/242; 180/291; 180/367; 180/54.1; 180/65.1; 180/233
(58) Field of Classification Search ............... 180/305, 180/242, 291, 367, 54.1, 65.1, 233
See application file for complete search history.

(56) References Cited

U.S. PATENT DOCUMENTS 3,956,005 A * 5/1976 Sugahara et al. .......... 106/434

| | | | |
|---|---|---|---|
| 7,163,078 B2 * | 1/2007 | Moya et al. ............... | 180/308 |
| 7,201,250 B1 * | 4/2007 | Hauser et al. ............. | 180/305 |
| 7,246,670 B2 * | 7/2007 | Hayashi et al. ............ | 180/6.2 |
| 2006/0167607 A1 * | 7/2006 | Nakamura et al. .......... | 701/50 |

FOREIGN PATENT DOCUMENTS

| JP | 02-240442 | 9/1990 |
|---|---|---|
| JP | 2002-144899 | 5/2002 |

OTHER PUBLICATIONS

International Search Report, Jul. 13, 2004.

\* cited by examiner

*Primary Examiner*—Christopher P. Ellis
*Assistant Examiner*—Cynthia F. Collado
(74) *Attorney, Agent, or Firm*—Cheng Law Group PLLC

(57) ABSTRACT

This invention provides an oil-hydraulic vehicle whose driving force can be adjusted finely and which can be run smoothly and comfortably. The oil-hydraulic vehicle comprises a wheel-driving means 40 for driving a wheel 31, which includes an oil-hydraulic motor 45 to drive the wheel 31 and a means 41 for controlling the rotational frequency of the oil-hydraulic motor 45. The oil-hydraulic motor 45 includes an output shaft 45s on which the wheel 31 is mounted and a plurality of oil chambers 45a-45e. Each oil chamber contains (i) a driving cogwheel 46 which is mounted on, and drives, the output shaft 45s and (ii) a driven cogwheel 47 which engages with the driving cogwheel 46. The means 41 for controlling the rotational frequency of the oil-hydraulic motor 45 includes a housing 42 with a circular rotor chamber 42h in it and a rotor 43 fitted in the circular rotor chamber 42h for free rotation.

2 Claims, 5 Drawing Sheets

(A)

(B)

F I G. 4
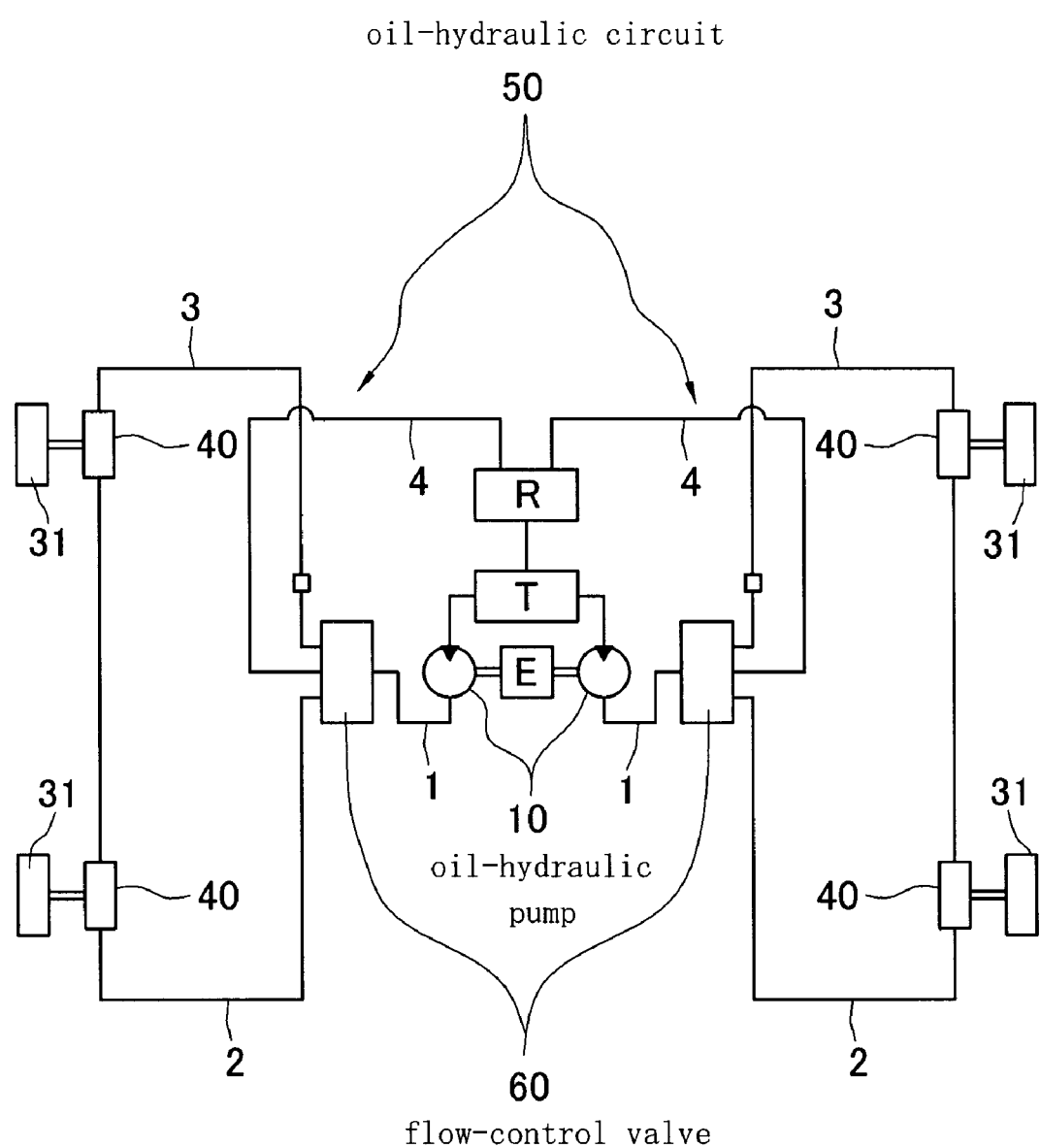

OIL-HYDRAULIC VEHICLE

TECHNICAL FIELD

This invention relates to an oil-hydraulic vehicle. More specifically, this invention relates to a driving mechanism for oil-hydraulic vehicles.

BACKGROUND ART

Oil-hydraulic vehicles have long been available. An oil-hydraulic vehicle currently in use comprises an engine, a transmission, an oil-hydraulic pump, and oil-hydraulic motors and transforms the power of the engine into wheel-driving force as follows.

First, the turning force of the engine is transformed by the transmission. Second, the transformed turning force is transformed into oil-hydraulic force by the oil-hydraulic pump. Then, the oil-hydraulic force is transformed into turning force by the oil-hydraulic motors to drive wheels. Thus, the turning force of the engine is transformed into wheel-driving force.

To change gears requires a clutch which connects the crankshaft of the engine and the input shaft of the transmission; accordingly, the drive line from the engine to the oil-hydraulic pump becomes complex.

On the other hand, disclosed in Japanese Patent No. 3415824 is an art of switching wheel-driving power by using flow-control valves alone. The advantage of the flow-control valves is that driving force can be adjusted without using a clutch and a complex transmission and, hence, vehicle weight can be reduced.

It is desirable, however, if the oil-hydraulic vehicle is provided with a mechanism capable of finer control of wheel-driving force than the control by the above flow-control valves, because the oil-hydraulic vehicle can be run more smoothly and more comfortably.

DISCLOSURE OF INVENTION

Object of Invention

Accordingly, it is the object of the present invention to provide an oil-hydraulic vehicle whose driving force can be adjusted finely and which can be run smoothly and comfortably.

SUMMARY OF THE INVENTION

According to the first feature of the present invention, there is provided an oil-hydraulic vehicle comprising an oil-hydraulic pump driven by an engine and a means which makes use of the hydraulic oil fed from the oil-hydraulic pump to drive at least one wheel. The means for driving said at least one wheel includes an oil-hydraulic motor to drive said at least one wheel and a means for controlling the rotational frequency of the oil-hydraulic motor. The oil-hydraulic motor includes an output shaft on which said at least one wheel is mounted and a plurality of oil chambers. Each oil chamber contains (i) a driving cogwheel which is mounted on, and drives, the output shaft and (ii) a driven cogwheel which engages with the driving cogwheel. The means for controlling the rotational frequency of the oil-hydraulic motor includes a housing with a circular rotor chamber in it and a rotor fitted in the circular rotor chamber for free rotation. An inlet port is made in the housing to let the hydraulic oil fed from the oil-hydraulic pump into the rotor chamber. Outlets of the same number as the oil chambers are made in the housing and arranged in the directions of turn of the rotor, and each outlet connects with different one of the oil chambers. A feed channel is made in the rotor to connect the inlet port selectively to one of the outlets.

According to the first feature of the present invention, there is provided an oil-hydraulic vehicle comprising an oil-hydraulic pump driven by an engine and a means which makes use of the hydraulic oil fed from the oil-hydraulic pump to drive at least one wheel. The means for driving said at least one wheel includes an oil-hydraulic motor to drive said at least one wheel and a means for controlling the rotational frequency of the oil-hydraulic motor. The oil-hydraulic motor includes an output shaft on which said at least one wheel is mounted and a plurality of oil chambers. Each oil chamber contains (i) a driving cogwheel which is mounted on, and drives, the output shaft and (ii) a driven cogwheel which engages with the driving cogwheel. The means for controlling the rotational frequency of the oil-hydraulic motor includes a housing with a circular rotor chamber in it and a rotor fitted in the circular rotor chamber for free rotation. An inlet port is made in the housing to let the hydraulic oil fed from the oil-hydraulic pump into the rotor chamber. Outlets of the same number as the oil chambers are made in the housing and arranged in the directions of turn of the rotor, and each outlet connects with different one of the oil chambers. A feed channel is made in the rotor to connect the inlet port selectively to one of the outlets. Made in the housing is an inlet (hereinafter "bypass inlet") which connects with a hydraulic-oil outlet of the oil-hydraulic motor through a bypass and made in the rotor is a bypass connection to connect the bypass inlet to the other outlets than an outlet which is connected with the inlet port through the feed channel.

According to the second feature of the present invention, there is provided the oil-hydraulic vehicle of the first feature, wherein a one-way clutch is provided between the output shaft and each driving cogwheel to connect the output shaft and said driving cogwheel when the rotational speed of said driving cogwheel is higher than the rotational speed of the output shaft and disconnect the output shaft and said driving cogwheel when the rotational speed of said driving cogwheel is lower than the rotational speed of the output shaft.

EFFECT OF THE INVENTION

The advantage offered by the first feature of the present invention is as follows. By turning the rotor of the means for controlling the rotational frequency of the oil-hydraulic motor, the inlet port can be connected selectively to one of the outlets through the feed channel. The outlets of the housing connects with the oil chambers. If the numbers of teeth of the driving cogwheels in the oil chambers of the oil-hydraulic motor are different from one another, they drive said at least one wheel at different speeds if hydraulic oil is fed to the oil-hydraulic motor at a constant flow rate. Accordingly, the rotational speed of said at least one wheel can be finely adjusted; therefore, the oil-hydraulic vehicle can be run smoothly and comfortably.

The advantage offered by the first feature of the present invention is as follows. By turning the rotor of the means for controlling the rotational frequency of the oil-hydraulic motor, the inlet port can be connected selectively to one of the outlets through the feed channel. The outlets of the housing connects with the oil chambers. If the numbers of teeth of the driving cogwheels in the oil chambers of the oil-hydraulic motor are different from one another, they drive said at least one wheel at different speeds if hydraulic oil is fed to the oil-hydraulic motor at a constant flow rate. Accordingly, the rotational speed of said at least one wheel can be finely adjusted; therefore, the oil-hydraulic vehicle can be run smoothly and comfortably. Besides, when gears are changed, the phased-out driving cogwheel continues rotating due to its inertia, operating like an oil pump, but does not run out of oil because of the bypass. Thus the phased-out driving cogwheel is prevented from being damaged for lack of oil.

The advantage offered by the second feature of the present invention is as follows. The driving cogwheels in oil chambers to which the hydraulic oil is not fed are prevented from rotating together with the output shaft, serving as oil pumps, and wasting part of the driving force of the driving cogwheel in an oil chamber to which the hydraulic oil is fed.

BRIEF DESCRIPTION OF DRAWINGS

FIGS. 1(A) and (B) are schematic plan and side views, respectively, of the wheel-driving means, and FIG. 1(C) is a schematic sectional view of the oil-hydraulic motor of the wheel-driving means.

FIG. 4 is a diagram of the oil-hydraulic circuit of the oil-hydraulic vehicle of the present invention.

BEST MODE FOR CARRYING OUT THE INVENTION

Figure 1:
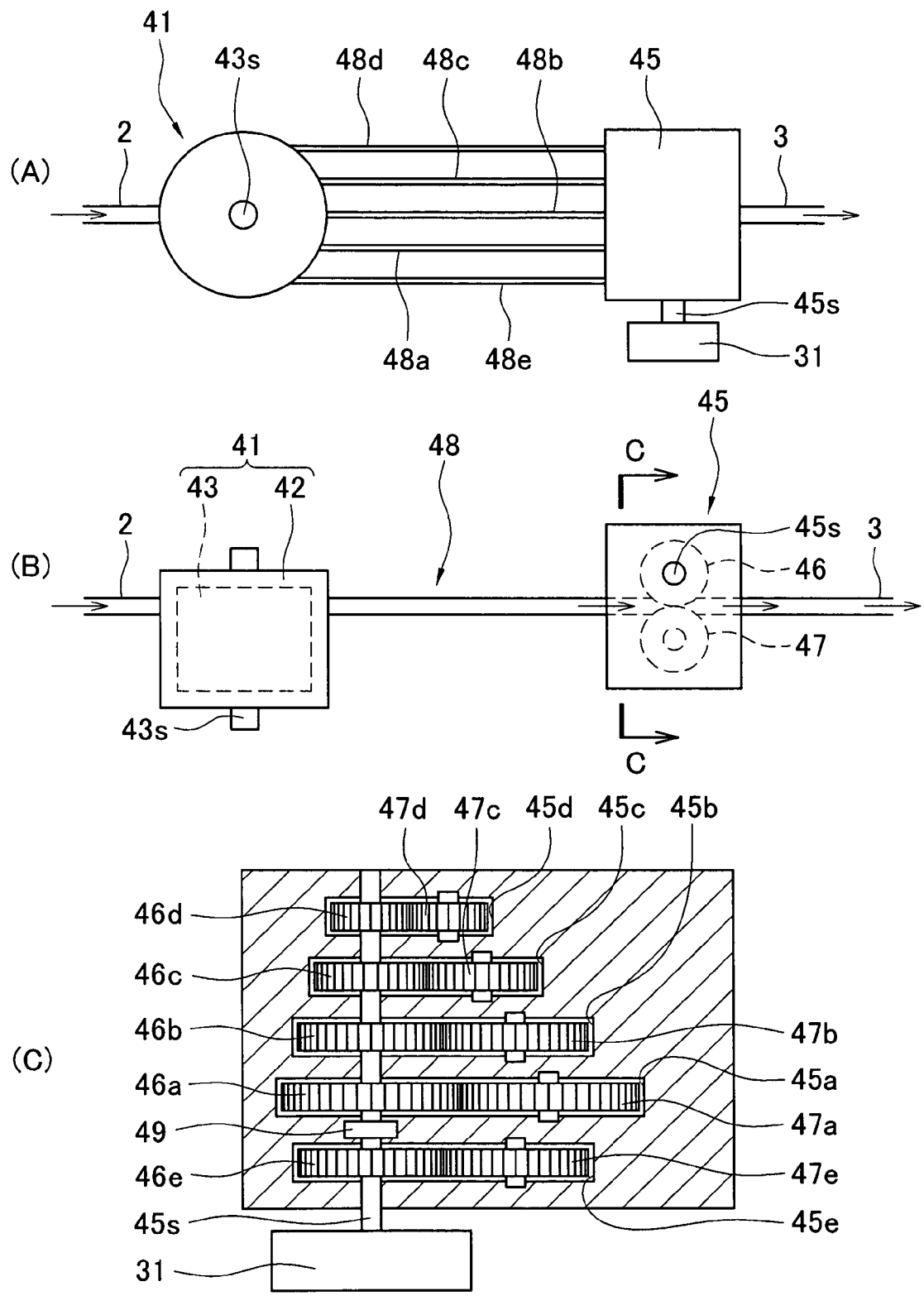
FIG. 1 is a schematic illustration of the wheel-driving means of the oil-hydraulic vehicle of the present invention.

By referring to the drawings, a preferred embodiment of oil-hydraulic vehicle of the present invention will be described below.

FIG. 4 is a diagram of the oil-hydraulic circuit of the oil-hydraulic vehicle. The reference letters "R," "T," and "E" indicate an oil cooler, an oil tank, and an engine, respectively. The reference numeral "10" indicates two oil-hydraulic pumps, such as well-known gear pumps, to be driven by the engine "E."

The reference numeral "50" is a oil-hydraulic circuit to return the oil discharged from the oil-hydraulic pumps 10 to the oil tank "T" through the oil cooler "R." Four wheel-driving means 40 are put in the oil-hydraulic circuit 50, between the oil-hydraulic pumps 10 and the oil tank "T." Each wheel-driving means 40 includes an oil-hydraulic motor 45 to drive a wheel 31. On each of the right and left sides of the oil-hydraulic vehicle, one oil-hydraulic pump 10 is connected to the inlets of the two oil-hydraulic motors 45 through a flow-control valve 60 by feed pipes 1 and 2. On each of the right and left sides of the oil-hydraulic vehicle, the outlets of the two oil-hydraulic motors 45 are connected to the oil tank "T" through the flow-control valve 60 by return pipes 3 and 4.

The construction of the flow-control valve 60 is substantially the same as that of the flow-control valve described in Japanese Patent No. 3415824, and the flow-control valve 60 has (i) a first changeover position to return the oil fed from the oil-hydraulic pump 10 directly to the oil tank "T" through the return pipe 4, (ii) a second changeover position to feed the oil fed from the oil-hydraulic pump 10 to the wheel-driving means 40 through the feed pipe 2 and return the oil coming back from the wheel-driving means 40 through the return pipe 3 to the oil tank "T" through the return pipe 4, and (iii) a third changeover position to feed the oil fed from the oil-hydraulic pump 10 to the wheel-driving means 40 through the return pipe 3 and return the oil coming back from the wheel-driving means 40 through the feed pipe 2 to the oil tank "T" through the return pipe 4.

Accordingly, the engine "E" drives the oil-hydraulic pumps 10, which feed the oil of the oil tank "T" to the flow control valves 60. When the flow control valves 60 are switched to their second changeover positions, the wheel-driving means 40 drive the wheels 31 to drive the vehicle in the forward direction. When the flow control valves 60 are switched to their first changeover positions, the wheel-driving means 40 stop driving the wheels 31. When the flow control valves 60 are switched to their third changeover positions, the wheel-driving means 40 drive the wheels 31 to drive the vehicle in the backward direction. Thus, the flow control valves 60 serve as a transmission by controlling the oil flows to the wheel-driving means 40 and thereby controlling their wheel-driving force. Accordingly, the oil-hydraulic vehicle without a transmission between the engine "E" and the oil-hydraulic pumps 10 can be driven forward and backward and stopped by operating the flow control valves 60.

Next, the wheel-driving means 40 will be described below.

Figure 2:
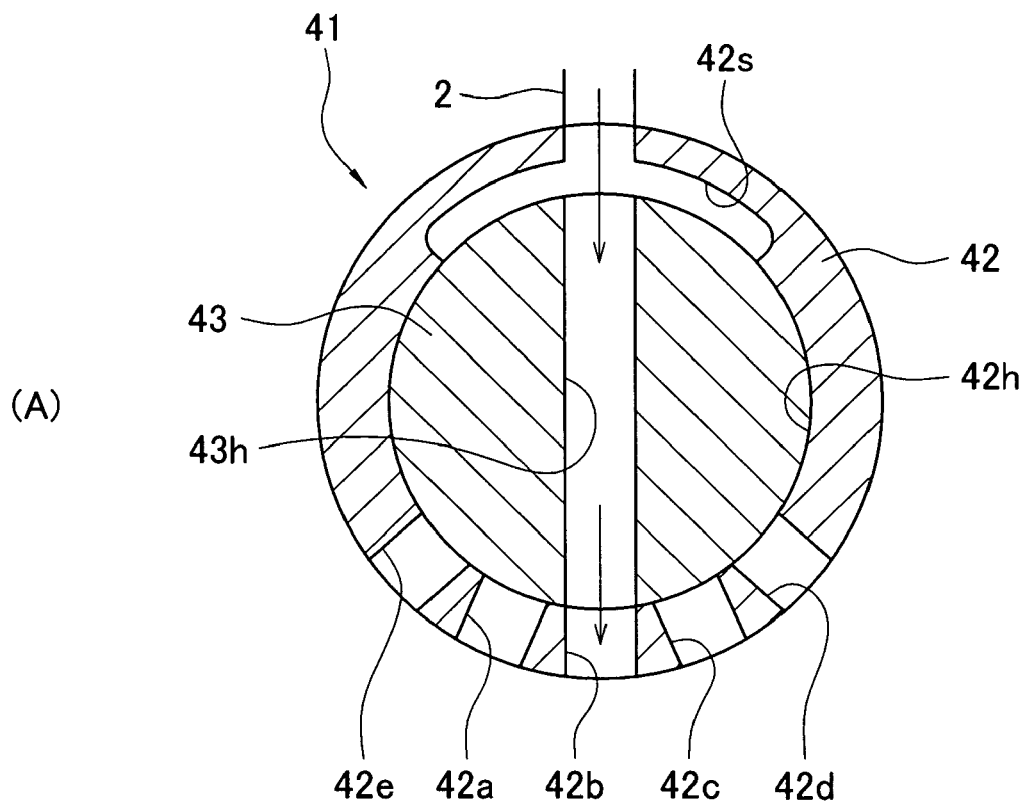
FIG. 2 is a schematic illustration of the means for controlling the rotational frequency of the oil-hydraulic motor shown in FIG. 1.
Figure 2:
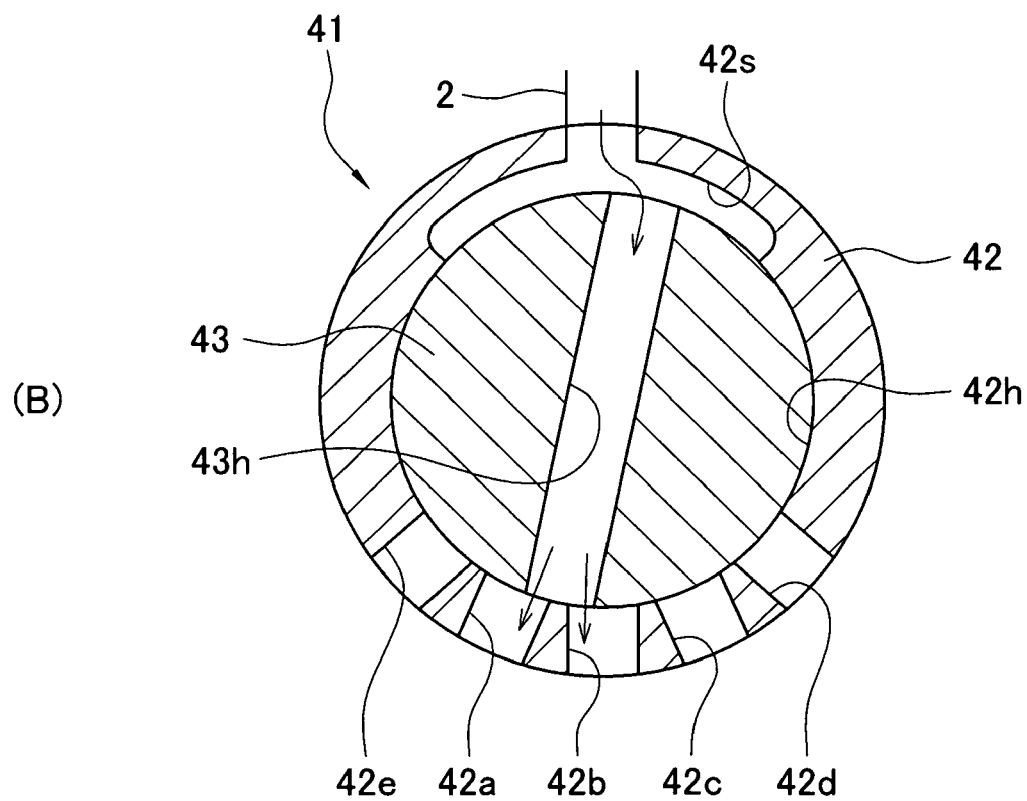

FIG. 1 is a schematic illustration of the wheel-driving means 40. FIGS. 1(A) and (B) are schematic plan and side views, respectively, of the wheel-driving means 40, and FIG. 1(C) is a schematic sectional view of the oil-hydraulic motor 45. The reference numeral 41 in FIGS. 1(A) and (B) is a means for controlling the rotational frequency of the oil-hydraulic motor 45 (hereinafter "rpm controller 41"). FIG. 2 is a schematic illustration of the rpm controller 41.

As shown in FIG. 1, the oil-hydraulic motor 45 has a housing and an output shaft $45s$ journaled in the housing and a wheel 31 is mounted on the front end of the output shaft $45s$. Mounted on the output shaft $45s$ are driving cogwheels $46a$-$46e$ with different numbers of teeth which are put in oil chambers $45a$-$45e$, respectively, provided in the housing. The driving cogwheels $46a$-$46e$ engage with driven cogwheels $47a$-$47e$, respectively, which are provided in the oil chambers $45a$-$45e$, respectively.

The feed pipe 2 is connected to the rpm controller 41, and the rpm controller 41 is connected to the oil chambers $45a$-$45e$ by feed pipes $48a$-$48e$, respectively. The return pipe 3, too, is connected to the oil chambers $45a$-$45e$.

A one-way clutch (not shown) is provided between the output shaft $45s$ and each of the driving cogwheels $46a$-$46d$. These clutches are well-known one-way clutches. In the forward-driving mode of the wheel-driving means 40, the one-way clutch of an active driving cogwheel $46a$, $b$, $c$, or $d$ connects the active driving cogwheel and the output shaft $45s$ when the rotational speed of the active driving cogwheel is higher than the rotational speed of the output shaft $45s$ and disconnects the active driving cogwheel and the output shaft $45s$ when the rotational speed of the active driving cogwheel is lower than the rotational speed of the output shaft $45s$.

On the other hand, the driving cogwheel $46e$ is disposed between the wheel 31 and the driving cogwheels $46a$-$46d$ and mounted on the output shaft $45s$, and a one-way clutch (not shown) is provided between the driving cogwheel 46e and the output shaft 45s. This one-way clutch disconnects the driving cogwheel 46e and the output shaft 45s in the forward-driving mode of the wheel-driving means 40 and connects the driving cogwheel 46e and the output shaft 45s in the backward-driving mode of the wheel-driving means 40.

A coupler 49 is provided between the section of the output shaft 45s where the driving cogwheels 46a-46d are mounted and the section of the output shaft 45s where the driving cogwheel 46e is mounted. The coupler 49 connects the two sections in the forward-driving mode of the wheel-driving means 40 to transmit the driving force of an active driving cogwheel 46a, b, c, or d to the wheel 31 and disconnects the two sections in the backward-driving mode of the wheel-driving means 40.

Thus, in the backward-driving mode of the wheel-driving means 40, the driving force of the driving cogwheel 46e is transmitted entirely to the wheel 31 and not to the driving cogwheels 46a-46d at all.

Accordingly, when oil is fed to one of the oil chambers 45a-45d through the feed pipe 2, the driving cogwheel in the active oil chamber 45a, b, c, or d drives the wheel 31 through the output shaft 45s to drive the oil-hydraulic vehicle forward. At this time, the driving cogwheels in the oil chambers to which oil is not fed are disconnected from the output shaft 45s by their one-way clutches; therefore, the inactive driving cogwheels are prevented from serving as oil pumps to waste part of the driving force of the active driving cogwheel.

When oil is fed to the oil chamber 45e through the return pipe 3, the driving cogwheel 46e drives the wheel 31 through the output shaft 45s to drive the oil-hydraulic vehicle backward. At this time, the driving cogwheels 46a-46d are isolated from the driving cogwheel 46e by the coupler 49; therefore, the inactive driving cogwheels 46a-46d are prevented from serving as oil pumps to waste part of the driving force of the active driving cogwheel 46e.

The one-way clutches between the driving cogwheels 46a-46e and the output shaft 45s are dispensable. Even if no one-way clutch is provided, any driving cogwheel can drive the wheel 31 if its driving energy is larger than the energy wasted by the other driving cogwheels serving as oil pumps.

Next, the rpm controller 41 will be described below.

As shown in FIG. 2, the rpm controller 41 comprises a housing 42 with a circular rotor chamber 42h in it and a rotor 43 fitted in the circular rotor chamber 42h for free rotation. Made in the rotor 43 is a feed channel 43h whose longitudinal center axis is perpendicular to the rotation axis of the rotor 43.

Made in the housing 42 are (i) an inlet port 42s which connects with the feed pipe 2, namely, the discharge opening of the oil-hydraulic pump 10 and (ii) outlets 42a-42e which are arranged in the directions of rotation of the rotor 43 and connect with feed pipes 48a-48e, respectively. Besides, the outlets 42a-42e are so disposed that the other end of the feed channel 43h will overlap one or two of the outlets 42a-42e when one end of the feed channel 43h overlaps the inlet port 42s.

Accordingly, when the rotor 43 is turned in the circular rotor chamber 42h, the inlet port 42s connects with one or two of the outlets 42a-42e by means of the feed channel 43h. Thus, by turning the rotor 43, the feed pipe 2 can be connected selectively to one or two of the outlets 42a-42e, namely, one or two of the oil chambers 45a-45e by means of the corresponding one or two of the feed pipes 48a-48e.

Because the numbers of teeth of the driving cogwheels 46a-46d are different from one another, the wheel 31 rotates at the lowest speed when the rotor 43 is turned so as to feed oil to the oil chamber 45a housing the driving cogwheel 46a with the largest number of teeth. When the rotor 43 is turned so as to feed oil to the oil chamber 45d housing the driving cogwheel 46d with the smallest number of teeth, the wheel 31 rotates at the highest speed. Thus, the rotational speed of the wheel 31, namely, the force to drive the oil-hydraulic vehicle can be adjusted finely in accordance with the numbers of teeth of the driving cogwheels 46a-46d.

When the rotor 43 is turned to connect the oil chamber 45e to the feed pipe 2 and oil is fed to the oil chamber 45e through the return pipe 3, the wheel 31 turns to drive the oil-hydraulic vehicle in the backward direction.

As mentioned earlier, the driving cogwheels in oil chambers to which oil is not fed do not rotate; therefore, the rotational speed of the output shaft 45s of the oil-hydraulic motor 45, or the wheel 31, is not affected by the driving cogwheels in the oil chambers other than an oil chamber to which oil is fed.

When the rotor 43 is turned, the feed channel 43h may be connected to adjacent two of the five outlets 42a-42e [for example, as shown in FIG. 2(B)]. In this case, the two driving cogwheels in the two active oil chambers rotate in accordance with the oil-feed rates to their respective oil chambers and the output shaft 45s is driven by one of the two active driving cogwheels whose rotational speed is higher than that of the other active driving cogwheel because of their one-way clutches. If the oil-flow rates to two adjacent oil chambers are changed continuously, the rotational speed of the driving cogwheel being phased in increases and the rotational speed of the driving cogwheel being phased out decreases. And the former speed and the latter speed become equal and then the former speed further increases and the latter speed further decreases. Namely, the active driving cogwheel which drives the output shaft 45s of the oil-hydraulic motor 45 can be changed among the driving cogwheels 46a-46e by turning the rotor 43. Besides, when the active driving cogwheel is changed from a driving cogwheel to an adjacent one, the rotational speeds of the two driving cogwheels become equal at some point in time without fail; accordingly, the rotational speed of the wheel 31 can be changed continuously. Therefore, the oil-hydraulic vehicle can be run smoothly and comfortably.

Figure 5:
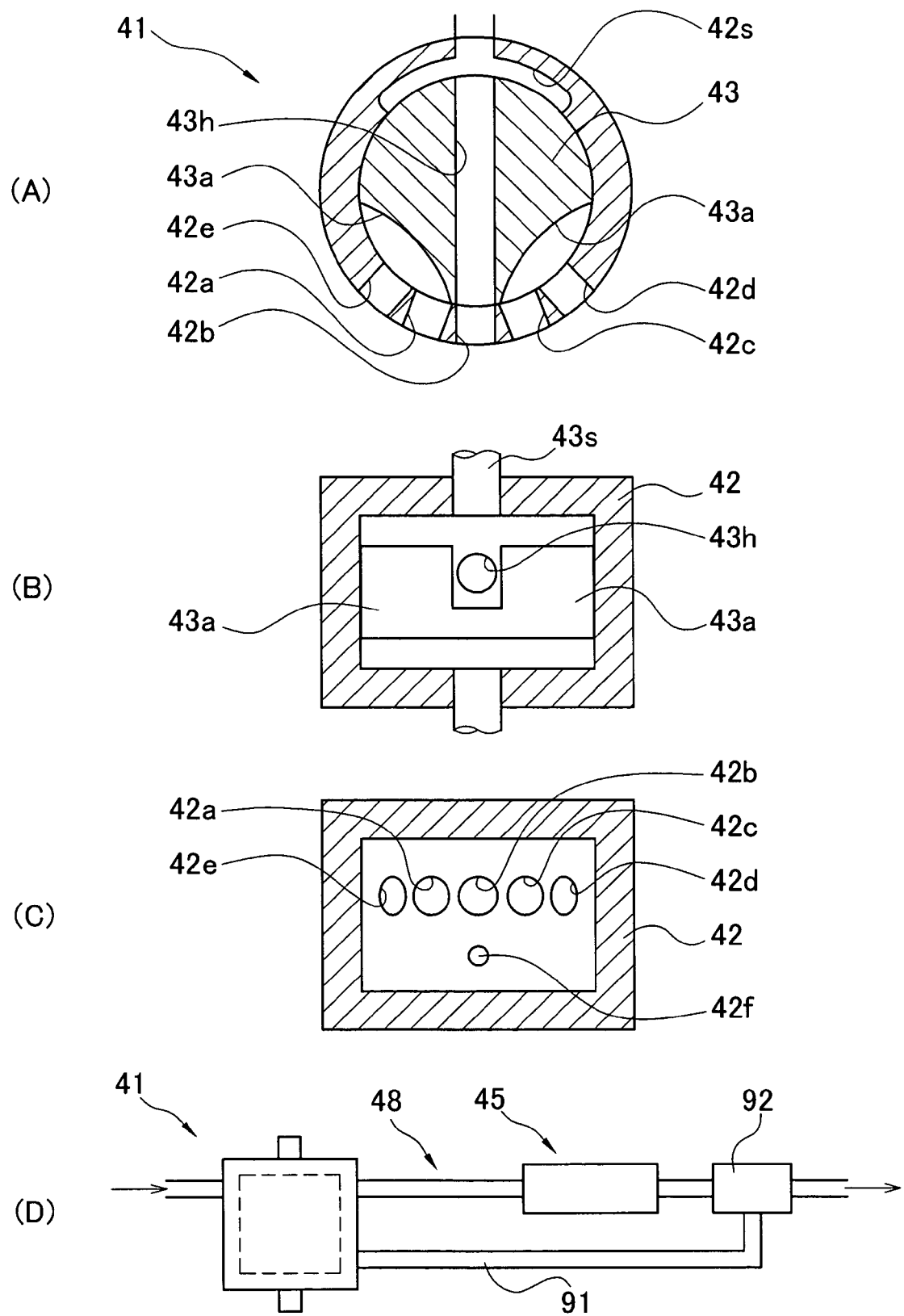
FIG. 5 is a schematic illustration of another embodiment of the means for controlling the rotational frequency of the oil-hydraulic motor of the oil-hydraulic vehicle of the present invention.

As shown in FIG. 5, the return pipe 3 may be provided with a branch-off box 92 where a bypass 91 branches off to an inlet 42f of the housing 42 of the rpm controller 41 and the rotor 43 may be provided with bypass connections 43a and 43a to connect the bypass 91 to four of the five oil chambers 45a-45e to which oil is not fed. In this case, when gears are changed, the phased-out driving cogwheel continues rotating due to its inertia, operating like an oil pump, but does not run out of oil because of the bypass. Thus, the phased-out driving cogwheel is prevented from being damaged for lack of oil.

Besides, if the above bypass is provided, the one-way clutches between the output shaft 45s and the driving cogwheels 46a-46e are dispensable. With the above bypass and without one-way clutches between the output shaft 45s and the driving cogwheels 46a-46e, any active driving cogwheel can drives the wheel 31 if its driving energy is larger than the energy wasted by the other inactive driving cogwheels serving as oil pumps.

Next, the control system of the rpm controller 41 will be described below.

Figure 3:
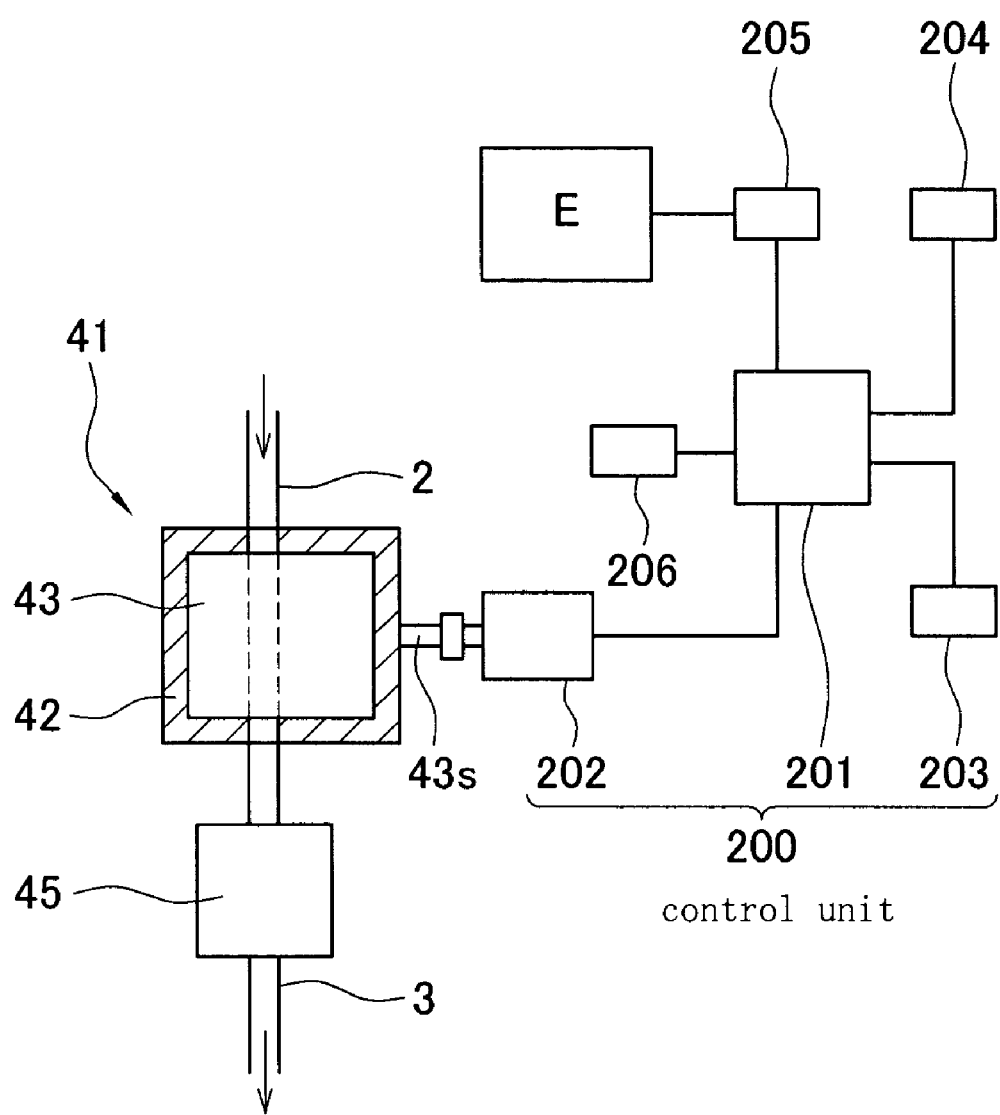
FIG. 3 is a block diagram of the control unit of the oil-hydraulic vehicle of the present invention.

FIG. 3 is a block diagram of a control unit 200 of the oil-hydraulic vehicle of the present invention. The reference numeral 202 is an actuator to control the turn of the rotor 43 of the rpm controller 41 of the wheel-driving means 40. The actuator 202 is, for example, a well-known motor, whose output shaft is coupled with the shaft 43s of the rotor 43. The actuator 202 may be any other device so long as it is capable of turning the rotor 43.

The reference numeral 201 is a controller to control the actuator. Connected with the controller 201 are a brake-pedal sensor 203, an accelerator-pedal sensor 204, a tachometer 205, and a speedometer 206. The controller 201 processes data from the sensors and meters and controls the actuator 202. Besides, the controller 201 is provided with a switch (not shown) to switch the running mode of the oil-hydraulic vehicle among stop, forward run, and backward run.

The oil-hydraulic vehicle may be provided with a finder to find the distance to a vehicle running ahead of it with, for example, a laser or camera so that the distance finder will send a signal to the controller 201 when the distance becomes smaller than a set value in the forward-running mode and the controller 201 will cause the actuator 202 to control the rpm controller 41 for the application of an engine brake. In this case, if a vehicle running ahead makes such a sudden stop as the driver of the oil-hydraulic vehicle cannot cope with it with the foot brake, the controller 201 will bring the oil-hydraulic vehicle automatically to a stop to secure safety.

The oil-hydraulic vehicle may be provided with a finder to find the distance to an object or pedestrian behind it with, for example, a laser or camera so that the distance finder will send a signal to the controller 201 when the distance becomes smaller than a set value in the backward-running mode and the controller 201 will cause the actuator 202 to control the rpm controller 41 for the application of an engine brake. In this case, if the driver inadvertently puts the oil-hydraulic vehicle in the backward-running mode instead of the forward-running mode and presses the accelerator to panic, the controller 201 brings the vehicle automatically to a stop to secure safety if there is an object or pedestrian behind the oil-hydraulic vehicle. Besides, if there is an object or pedestrian put out of the driver's sight, the controller 201 brings the vehicle to a stop automatically to secure safety.

The rotor 43 of the rpm controller 41 may be handled manually. In this case, a lever provided at the steering wheel may be linked with the shaft 43s of the rotor 43.

INDUSTRIAL APPLICABILITY

The present invention is applicable to various types of vehicles such as cars, trucks, agricultural machines including farm tractors, and construction machines including bulldozers.

The invention claimed is:

1. An oil-hydraulic vehicle comprising:
   an oil-hydraulic pump driven by an engine; and
   a means which makes use of the hydraulic oil fed from the oil-hydraulic pump to drive at least one wheel,
   the means for driving said at least one wheel including:
   an oil-hydraulic motor to drive said at least one wheel; and
   a means for controlling the rotational frequency of the oil-hydraulic motor, the oil-hydraulic motor including:
   an output shaft on which said at least one wheel is mounted; and
   a plurality of oil chambers, each oil chamber containing (i) a driving cogwheel which is mounted on, and drives, the output shaft and (ii) a driven cogwheel which engages with the driving cogwheel
   the means for controlling the rotational frequency of the oil-hydraulic motor including:
   a housing with a circular rotor chamber in it; and
   a rotor fitted in the circular rotor chamber for free rotation,
   an inlet port being made in the housing to let the hydraulic oil fed from the oil-hydraulic pump into the rotor chamber,
   outlets of the same number as the oil chambers being made in the housing and arranged in the directions of turn of the rotor, each outlet connecting with different one of the oil chambers,
   a feed channel being made in the rotor to connect the inlet port selectively to one of the outlets,
   made in the housing being an inlet (hereinafter "bypass inlet") which connects with a hydraullic-oil outlet of the oil-hydraulic motor through a bypass and made in the rotor being a bypass connection to connect the bypass inlet to the other outlets than an outlet which is connected with the inlet port through the feed channel.

2. The oil-hydraulic vehicle according to claim 1, wherein a one-way clutch is provided between the output shaft and each driving cogwheel to connect the output shaft and said driving cogwheel when the rotational speed of said driving cogwheel is higher than the rotational speed of the output shaft and disconnect the output shaft and said driving cogwheel when the rotational speed of said driving cogwheel is lower than the rotational speed of the output shaft.

* * * * *